United States Patent [19]
Lacroix et al.

[11] Patent Number: 5,880,049
[45] Date of Patent: Mar. 9, 1999

[54] REGENERATION OF CATALYSTS FOR GAS PHASE FLUORINATION

[75] Inventors: Eric Lacroix, Amberieux d'Azergues; Bernard Cheminal, Saucieu-En-Jarrest; Benoit Requieme, Charly, all of France

[73] Assignee: Elf Atochem S.A., France

[21] Appl. No.: 828,425

[22] Filed: Mar. 28, 1997

[30] Foreign Application Priority Data

Mar. 29, 1996 [FR] France .................................. 96 03972

[51] Int. Cl.⁶ ............................. B01J 38/46; B01J 38/42; B01J 20/34
[52] U.S. Cl. ................................. 502/36; 502/35
[58] Field of Search .................... 502/34, 35, 36

[56] References Cited

U.S. PATENT DOCUMENTS

| | | | |
|---|---|---|---|
| H1129 | 1/1993 | Gumprecht | 570/168 |
| 5,227,350 | 7/1993 | Scott et al. | 502/36 |
| 5,262,575 | 11/1993 | Dianis | 570/235 |
| 5,407,877 | 4/1995 | Scott | 502/36 |

FOREIGN PATENT DOCUMENTS

| | | |
|---|---|---|
| 2150853 | 12/1995 | Canada . |
| 475693A1 | 3/1992 | European Pat. Off. . |
| 475693B1 | 12/1995 | European Pat. Off. . |
| 685262 | 12/1995 | European Pat. Off. . |
| 4419534 | 10/1995 | Germany . |
| 1262946/89 | 12/1974 | Japan . |
| 49-1334612 | 12/1974 | Japan . |
| 49-134612 | 12/1974 | Japan ............................... B01J 23/36 |
| WO 97/11043 | 3/1997 | WIPO . |

OTHER PUBLICATIONS

French Search Report dated Dec. 16, 1996.

*Primary Examiner*—Michael Lewis
*Assistant Examiner*—Alexander G. Ghyka
*Attorney, Agent, or Firm*—Bell, Boyd & Lloyd

[57] ABSTRACT

In order to regenerate the activity of a catalyst for gas phase fluorination the spent catalyst is treated with chlorine and hydrogen fluoride, at a temperature of between 250° and 450° C.

16 Claims, No Drawings

REGENERATION OF CATALYSTS FOR GAS PHASE FLUORINATION

REGENERATION OF CATALYSTS FOR GAS PHASE FLUORINATION

Field of the Invention

The present invention relates to the synthesis of hydrohaloalkanes by fluorination and its subject-matter is more particularly a process for regeneration of the catalysts for gas phase fluorination, the said regeneration consisting in treating the spent catalyst with a flow of HF and chlorine.

Background of the Invention

The intensive research into substitutes for chlorofluorocarbons (CFCs) is being directed, inter alia, towards the synthesis of hydrohaloalkanes. Some stages of these syntheses can be carried out by fluorination with hydrogen fluoride, using heterogeneous gas-phase catalysis. Many fluorination catalysts have been developed for this purpose and are described in the literature.

The synthesis, using fluorination, of halogen compounds containing hydrogen atoms has been found to be more complex than the synthesis of perhalogenated molecules (CFCs). In fact, the hydrogen compounds (raw materials, reaction intermediates or finished products) are more fragile than perhalogenated compounds and the presence of hydrogen atoms can give rise to dehydrohalogenation reactions, producing olefins which are liable to be decomposed and to foul the catalyst. Furthermore, the substitution of a chlorine with a fluorine on a carbon-based group also carrying hydrogen atoms is difficult and must often be carried out in severe operational conditions, resulting in more rapid deactivation of the catalyst.

The fluorination of F133a ($CF_3$—$CH_2Cl$) to F134a ($CF_3$—$CH_2F$), an example widely described in the literature, is a good illustration of these difficulties. In this case the dehydrofluorination of F133a produces F1122 ($CF_2$=CHCl), which is one of the precursors of the "coke" resulting in catalyst fouling. Furthermore, this Cl/F substitution is difficult and unfavoured thermodynamically; it therefore requires relatively high temperatures (>300° C.), which accelerate this coking and give rise to risks of deactivation due to change in the catalyst structure (crystallization etc.). Other fluorination reactions, in principle easier, are based on the fluorination of halogenated olefins ($C_2HCl_3$, $C_2Cl_4$, etc.) or of compounds liable to decompose thermally (F30, etc.); they therefore also present risks of coking.

The term "coke" is intended to mean not only the true coke deposited on the catalyst, but also all the heavy organic substances which foul the catalyst and have a chemical formula resembling that of halogenated polymers; they originate from the decomposition of the reactants and of the reaction products in the conditions of gas phase fluorination.

In order to improve the durability of the fluorination catalysts, various processes for regeneration or for maintenance of their activity have already been described in the literature. Thus, Japanese Patent Application 1262946/89 describes the regeneration, in the absence of organic substances, of chromium-based fluorination catalysts by a treatment in the presence of oxygen.

Patent application EP 475 693 also claims a process for regeneration of chromium-based catalysts, but this time using a treatment by means of a mixture of oxygen-containing oxidizing agent and of HF (more especially an air/HF mixture), at a temperature of between 300° and 500° C. Similarly, U.S. Pat. No. 5,407,877 describes the regeneration of the same catalysts in the presence of water vapour.

Continuous addition of chlorine during disproportionation reactions (absence of HF) is described in Japanese Patent Application 49-134612/74 in order to maintain the activity of chromium-based catalysts.

Finally, document H1129 (U.S. Statutory Invention Registration) describes the continuous addition of chlorine during the fluorination of F133a, to maintain the catalytic activity of a chromium-based catalyst.

These processes are not, however, completely satisfactory. In fact, those based on a regeneration in the presence of oxygen by burning the "coke" require perfect control of the exothermicity, throughout the regeneration, in order to avoid the formation of hot spots in the catalyst bed, which are detrimental to the catalyst.

As a result of a chlorination of the organic products (replacement of a hydrogen atom by a chlorine atom), continuous addition of chlorine in order possibly to improve the lifetime of the catalyst during the synthesis of hydrofluoroalkanes or of hydrochlorofluoroalkanes is reflected in a loss of selectivity for the proper product and hence in a loss in yield.

A process for regeneration of deactivated fluorination catalysts which does not exhibit these disadvantages has now been found. This process, based on the treatment of the deactivated catalyst with chlorine and hydrogen fluoride, makes it possible not only to restore the activity of the catalyst, but is easy to implement industrially and, as a result of very low exothermicity, makes it possible to avoid an irreversible crystallization of the catalyst. In fact, apart from the heat of adsorption of the reactants during the initial minutes, after they are introduced onto the catalyst from which HF and organic products have been desorbed, the regeneration using the $Cl_2$/HF mixture is practically not exothermic and in contrast to a regeneration by burning the "coke" (in the presence of oxygen) does not require a perfect control of the exothermicity throughout the regeneration.

DESCRIPTION OF THE INVENTION

The subject-matter of the present invention is therefore a process for gas-phase regeneration of fluorination catalysts, characterized in that it consists in treating the deactivated catalyst with $Cl_2$ and HF, optionally in the presence of an inert substance, at a temperature of between 250° and 450° C.

The optimum temperature has to be chosen as a function of the conditions (nature of the organic compounds, temperature, etc.) of the fluorination which has preceded the regeneration. This optimum temperature is generally equal to or slightly higher than that used in practice during the fluorination; it is therefore very often between 300° and 430° C.

In the absence of organic compounds the introduction of hydrogen fluoride and of chlorine can be performed simultaneously or by alternate introduction of either of the reactants. In this latter case the alternation must be frequent (for example every 10 minutes) to obtain an efficacious and rapid regeneration. However, where the efficiency of the regeneration is concerned, it has been found preferable to work with a simultaneous introduction of HF and chlorine. During a simultaneous introduction the $HF/HF+Cl_2$ molar ratio (MR) can be variable (0<MR<1), but for reasons of efficiency it is preferable to work with an $HF/HF+Cl_2$ molar ratio of between 0.05 and 0.995 and more particularly between 0.3 and 0.99. The value of the MR may even be modified during the regeneration; thus, for example, it is possible to start with a chlorine-rich mixture in order to end with an HF-rich mixture.

The duration of the regeneration quite obviously depends on the deactivation state of the catalyst, the regeneration conditions and the degree of regeneration which is sought. It is generally between 10 and 300 hours and in most cases between 24 and 150 hours. It is preferable to regenerate the catalyst as soon as the first signs of deactivation appear ("preventive" regeneration), rather than wait for a considerable deactivation and, hence, a more difficult regeneration. The frequency of these regenerations must be optimized as a function of the savings in the lifetime of the catalyst in relation to the losses of production which they cause.

During the regeneration the time of contact of the reactants with the catalyst can also be very variable and lie between 1 second and infinity (static regeneration). It is more generally between 5 and 300 seconds and preferably between 10 and 60 seconds.

The regeneration is often conducted at the same pressure as the fluorination reaction or at a lower pressure. It is even possible to envisage operating under a slight vacuum, so as better to desorb the heavy substances deposited on the catalyst. The regeneration is generally conducted at a pressure of between 10 kPa and 5 MPa and in most cases between 50 kPa and 2 MPa.

Bearing in mind its low exothermicity (apart from the heat of adsorption of the HF and $Cl_2$ reactants onto the catalyst), the regeneration according to the invention can be conducted in the fluorination reactor, even if the latter is a monotubular reactor. Such a situation is very practical when it is intended to carry out preventive, and hence frequent, regenerations. On the other hand, in order to gain on plant output, it may be advantageous to discharge the catalyst and to regenerate it in a piece of equipment devised for this purpose, while a second catalyst charge is being recharged and then employed in the fluorination unit. Another possibility consists in working with two reactors alternately: one on fluorination, the other on regeneration, and then vice versa.

The $Cl_2$/HF regeneration according to the invention can be applied to any catalysts for gas phase fluorination which are described in the literature. It is particularly well suited to catalysts consisting of at least one of the following metals: Cr, V, Co, Mg, Fe, Ni and Zn.

In the case of chromium-based catalysts the regeneration according to the present invention does not induce any chromium losses due to oxidation of $Cr^{III}$. Such losses can be observed when oxygen is employed, but the $Cl_2$/HF combination does not present this disadvantage.

As indicated above, continuous addition of chlorine during the fluorination of hydrogen-containing organic compounds is generally not advantageous, because it results in a loss in yield. However, in the case of organic compounds which, like, for example, dichloromethane (F30) and/or chlorofluoromethane (F31), react weakly with chlorine (chlorine conversion lower than 95% in one pass over the catalyst), it may be found economically advantageous to regenerate the catalyst by noncontinuous addition of chlorine during the fluorination reaction. In contrast to a regeneration of the catalyst away from organic substances, this technique makes it possible not to interrupt the production of the unit; the momentary loss in selectivity, due to the portion of the chlorine which reacts with the organic substances, is then compensated by a gain in output.

An optimization of the frequency of the regenerations generally results in a regeneration being programmed when the catalyst has lost between 5 and 60%, preferably between 10 and 30%, of its activity. This type of regeneration, without interrupting the production of the fluorination unit, is not recommended when the organic compounds are highly reactive towards chlorine (as in the fluorination of olefins like $C_2Cl_4$ or $C_2HCl_3$).

EXAMPLES

The following examples illustrate the invention without limiting it.

Example 1

$Cr_2O_3$, catalyst (fluorination of F133a)

A $Cr^{III}$ oxide-based catalyst (50 ml), deactivated after being used for the fluorination of F133a to F134a, is treated at 350° C., at atmospheric pressure, for 72 hours with a mixture of HF and chlorine with respective flow rates of 0.25 moles/hour and 0.01 mole/hour.

The activity of the catalyst before and after regeneration was tested in the conditions and with the results in Table I.

Quantitative determinations of chromium in the gas-scrubber water at the exit of the reactor, during the regeneration and during the fluorination sequence which follows it, have made it possible to conclude that there are no losses in chromium due to this regeneration technique.

Example 2

$Cr_2O_3$ catalyst (fluorination of F133a)

A $Cl_2$/HF regeneration was tested on a 2 $m^3$ charge of $Cr_2O_3$ catalyst in an industrial monotubular reactor. The fluorination of F133a is stopped by gradually raising the HF/organics molar ratio in order to finish under pure HF. The regeneration is ensured by adding chlorine to the HF flow. The flow rates employed are those of Example 1, but proportioned to the catalyst charge to be treated. No exotherm greater than 5° C. was observed in this industrial regeneration. The results shown in Table I indicate that the regeneration has produced the same gain in conversion as during the laboratory test (Example 1).

Example 3

Cr—Zn/$AlF_3$ catalyst (fluorination of F133a)

A catalyst (50 ml) based on Cr and Zn which are supported on a fluorinated alumina, deactivated after being used for the fluorination of F133a to F134a, was treated at 350° C., at atmospheric pressure, for 72 hours with an HF/$Cl_2$ mixture with respective flow rates of 0.25 moles/hour and 0.01 mole/hour. The results of activity before and after regeneration are shown in Table I.

Example 4

Ni—Cr/$AlF_3$ catalyst (fluorination of F133a)

A catalyst (50 ml) based on Ni and Cr which are supported on a fluorinated alumina, deactivated after being used for the fluorination of F133a to F134a, was treated at 350° C., at atmospheric pressure, for 68 hours with an HF/$Cl_2$ mixture with respective flow rates of 0.25 moles/hour and 0.01 mole/hour. The results of activity before and after regeneration are shown in Table I.

Example 5

Ni/AlF$_3$ catalyst (fluorination of F133a)

A catalyst (50 ml) based on Ni supported on a fluorinated alumina, deactivated after being used for the fluorination of F133a to F134a, was treated at 350° C., at atmospheric pressure, for 90 hours with an HF/Cl$_2$ mixture with respective flow rates of 0.25 moles/hour and 0.01 mole/hour. The results of activity before and after regeneration are shown in Table I.

Example 6

Ni—Cr/AlF$_3$ catalyst (fluorination of F1110)

A catalyst (50 ml) based on Ni and Cr which are supported on a fluorinated alumina, deactivated after being used for the fluorination of perchloroethylene, was treated at 350° C., at atmospheric pressure, for 72 hours with an HF/Cl$_2$ mixture with respective flow rates of 0.25 moles/hour and 0.02 moles/hour. The results of activity before and after regeneration are shown in Table II.

Example 7 comparative: Ni—Cr/AlF$_3$ catalyst in fluorination of F1110 (regeneration with chlorine alone)

A sample (50 ml) of the same batch of spent catalyst as that described in Example 6 was treated in the same conditions as in Example 5, but without introduction of HF (regeneration with Cl$_2$ alone). The results of activity before and after regeneration are shown in Table II.

Example 8 comparative: Ni—Cr/AlF$_3$ catalyst in fluorination of F1110 (regeneration with HF alone)

A sample (50 ml) of the same batch of spent catalyst as that described in Example 6 was treated in the same conditions as in Example 5, but without introduction of chlorine (regeneration with HF alone). The results of activity before and after regeneration are shown in Table II.

Example 9

Ni—Cr/AlF$_3$ catalyst (fluorination of F123)

A catalyst (50 ml) based on Ni and Cr which are supported on a fluorinated alumina, deactivated after being used for the fluorination of F123 (CF$_3$—CHCl$_2$) was treated at 350° C., at atmospheric pressure, for 48 hours with an HF/Cl$_2$ mixture with respective flow rates of 0.25 moles/hour and 0.02 moles/hour. The results of activity before and after regeneration are shown in Table II.

Example 10

Ni—Cr/AlF$_3$ catalyst (fluorination of F30)

A catalyst (50 ml) based on Ni and Cr which are supported on a fluorinated alumina, deactivated after being used for the fluorination of F30 (CH$_2$Cl$_2$) was treated at 350° C., at atmospheric pressure, for 96 hours with an HF/Cl$_2$ mixture with respective flow rates of 0.25 moles/hour and 0.02 moles/hour. The results of activity before and after regeneration are shown in Table III.

Example 11

Ni—Cr/AlF$_3$ catalyst (regeneration during the fluorination of F30)

A catalyst (35 ml) based on Ni and Cr which are supported on a fluorinated alumina is employed at 15 bars, at 300° C. and with an HF/F30 molar ratio of 3. When the activity has dropped by approximately 30% the catalyst is regenerated without interrupting the fluorination, by adding chlorine to the reactants for 12 hours (Cl$_2$/F30 molar ratio=0.02).

The results of activity before and after regeneration are shown in Table III. The losses in selectivity are of the order of 1%.

Example 12

Cr/charcoal catalyst (fluorination of F1216)

A catalyst (50 ml) based on Cr$^{III}$ oxide supported on charcoal, deactivated by gas phase fluorination of F1216 (CF$_3$—CF=CF$_2$) to F227e (CF$_3$—CHF—CF$_3$) was regenerated at 350° C., at atmospheric pressure, for 72 hours with an HF/Cl$_2$ mixture with respective flow rates of 0.25 moles/hour and 0.01 mole/hour. The results of activity before and after regeneration are shown in Table III.

In distinction from a regeneration in the presence of oxygen, a Cl$_2$/HF regeneration does not present any risk of ignition (reactor placed under inert substance before the regeneration) of the catalyst charge, including with a catalyst supported on charcoal.

The examples described above show the effectiveness of a Cl$_2$/HF regeneration on various deactivated fluorination catalysts, after use on various fluorination reactions. Comparison Example 6 with Examples 7 and 8 expresses well the superior effectiveness of a Cl$_2$/HF regeneration when compared with those employing only one of the two reactants.

Finally, Examples 1 and 12 illustrate the advantages of this Cl$_2$/HF regeneration when compared with a regeneration in the presence of oxygen: no chromium losses, very little or no exothermicity, no risk of ignition of the catalyst charge, even in the presence of charcoal.

In Tables I to III the abbreviations employed have the following meanings:

tc.(s)=Contact time in seconds

MR=Molar ratio

OC=Overall conversion

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

TABLE I

Catalysts for fluorination of F133a

| EXAMPLE (Catalyst) | CATALYST STATE | TEST CONDITIONS ||||  ACTIVITY OC F133a (%) |
|---|---|---|---|---|---|---|
| | | Temp. (°C.) | tc. (s) | Pressure (in MPa) | HF/Org. MR | |
| 1 (bulk Cr) | Initial | 350 | 4.2 | 0.1 | 4 | 22.5 |
| | Spent | 350 | 4.1 | 0.1 | 4 | 12.1 |
| | Regenerated | 350 | 4.2 | 0.1 | 4 | 22.1 |
| 2 (bulk Cr) | Initial | 350 | 22 | 1.5 | 2 | 15.6 |
| | Spent | 350 | 21.8 | 1.5 | 2 | 8.1 |
| | Regenerated | 350 | 21.8 | 1.5 | 2 | 15.8 |
| 3 ($Cr-Zn/AlF_3$) | Initial | 340 | 2.1 | 0.1 | 3.6 | 15.8 |
| | Spent | 340 | 2 | 0.1 | 3.8 | 8.2 |
| | Regenerated | 340 | 2 | 0.1 | 3.5 | 13.9 |
| 4 ($Ni-Cr/AlF_3$) | Initial | 340 | 2.1 | 0.1 | 3.5 | 16.7 |
| | Spent | 340 | 2.1 | 0.1 | 3.6 | 10.2 |
| | Regenerated | 340 | 2.1 | 0.1 | 3.6 | 16.5 |
| 5 ($Ni/AlF_3$) | Initial | 350 | 3.9 | 0.1 | 4.4 | 18.7 |
| | Spent | 350 | 4.1 | 0.1 | 4.1 | 10.1 |
| | Regenerated | 350 | 3.7 | 0.1 | 4.3 | 19.2 |

TABLE II

Catalysts for fluorination in F120 series

| EXAMPLE (Catalyst) | CATALYST STATE | TEST CONDITIONS |||| ACTIVITY OC org. (%) |
|---|---|---|---|---|---|---|
| | | Temp. (°C.) | tc. (s) | Pressure (in MPa) | HF/Org. MR | |
| 6 ($Ni-Cr/AlF_3$) | Initial | 350 | 4.8 | 0.1 | 7.2 | 69.6 |
| | Spent | 350 | 5 | 0.1 | 6.9 | 31.5 |
| | Regenerated | 350 | 5.9 | 0.1 | 6.9 | 71.3 |
| 7 Comparative ($Ni-Cr/AlF_3$) | Initial | 350 | 4.8 | 0.1 | 7.2 | 69.6 |
| | Spent | 350 | 4.2 | 0.1 | 4.7 | 24.1 |
| | Regenerated | 350 | 4.1 | 0.1 | 4 | 28.2 |
| 8 Comparative ($Ni-Cr/AlF_3$) | Initial | 350 | 4.8 | 0.1 | 7.2 | 69.6 |
| | Spent | 350 | 4.2 | 0.1 | 4.7 | 24.1 |
| | Regenerated | 350 | 4 | 0.1 | 4 | 26.8 |
| 9 ($Ni-Cr/AlF_3$) | Initial | 350 | 14.7 | 0.1 | 2.1 | 74.3 |
| | Spent | 350 | 14.7 | 0.1 | 2 | 56.1 |
| | Regenerated | 350 | 14.3 | 0.1 | 2.3 | 71.6 |

TABLE III

| EXAMPLE (Catalyst) | CATALYST STATE | TEST CONDITIONS |||| ACTIVITY OC org. (%) |
|---|---|---|---|---|---|---|
| | | Temp. (°C.) | tc. (s) | Pressure (in MPa) | HF/Org. MR | |
| 10 ($Ni-Cr/AlF_3$ in fluorination of F30) | Initial | 250 | 0.5 | 0.1 | 3 | 53.6 |
| | Spent | 250 | 0.5 | 0.1 | 3.6 | 35.9 |
| | Regenerated | 250 | 0.5 | 0.1 | 3.15 | 55.2 |
| 11 ($Ni-Cr/AlF_3$ in fluorination of F30) | Initial | 300 | 5 | 1.5 | 3 | 43.4 |
| | Spent | 300 | 5 | 1.5 | 3 | 31.6 |
| | Regenerated | 300 | 4.9 | 1.5 | 2.9 | 44.3 |
| 12 Cr/C in fluorination of F1216) | Initial | 330 | 20.5 | 0.1 | 2 | 99.9 |
| | Spent | 330 | 20.2 | 0.1 | 2.1 | 75.3 |
| | Regenerated | 330 | 19.9 | 0.1 | 1.9 | 98.1 |

We claim:

1. Process for regeneration of catalysts for gas-phase fluorination consisting of regenerating deactivated catalyst from gas-phase fluorination with chlorine and hydrogen fluoride, optionally in the presence of an inert substance, at a temperature between 250° and 450° C.

2. Process according to claim 1, wherein the operation is carried out at a temperature of between 300° and 430° C.

3. Process according to claim 2, wherein the operation is carried out with an $HF/HF+Cl_2$ molar ratio of between 0.05 and 0.995.

4. Process according to claim 1, wherein a chlorine-rich mixture is employed first and the regeneration is ended with an HF-rich mixture.

5. Process according to claim 1, wherein the operation is carried out at a pressure of between 10 kPa and 5MPa.

6. Process according to claim 1, wherein the time of contact of reactants with the catalyst is between 5 and 300 seconds.

7. Process according to claim 1, wherein the duration of regeneration is between 10 and 300 hours.

8. Process according to claim 1, wherein treatment is performed in the absence of organic compounds.

9. Process according to claim 1, wherein the regeneration is performed by noncontinuous addition of chlorine during the fluorination of an organic compound which is substantially inactive towards chlorine.

10. Process according to claim 9, wherein the organic compound is dichloromethane or chlorofluoromethane or mixtures thereof.

11. Process according to claim 3, wherein the molar ratio is between 0.3 and 0.99.

12. Process according to claim 5, wherein the pressure is between 50 kPa and 2MPa.

13. Process according to claim 6, wherein the time of contact is between 10 and 60 seconds.

14. Process according to claim 7, wherein the duration is between 24 and 150 hours.

15. Process according to claim 1, wherein the deactivated catalyst consists of at least one metal selected from the group consisting of Cr, V, Co, Mg, Fe, Ni and Zn.

16. Process for regeneration of catalysts for gas-phase fluorination consisting of regenerating deactivated catalyst from gas-phase fluorination with chlorine and hydrogen fluoride, optionally in the presence of an inert substance, at a temperature between 250° and 450° C., employing a chlorine-rich mixture first and ending the regeneration with an HF-rich mixture.

* * * * *